(12) United States Patent  
Chowdhary et al.

(10) Patent No.: US 9,355,064 B2  
(45) Date of Patent: May 31, 2016

(54) TRACKING VEHICLE LOCATIONS IN A PARKING LOT FOR DEFINITIVE DISPLAY ON A GUI

(71) Applicants: Gaurav Chowdhary, Edison, NJ (US); Sachin Chaudry, Edison, NJ (US)

(72) Inventors: Gaurav Chowdhary, Edison, NJ (US); Sachin Chaudry, Edison, NJ (US)

(73) Assignees: Gaurav Chowdhary, Edison, NJ (US); Sachin Chaudhry, Edison, NJ (US)

( * ) Notice: Subject to any disclaimer, the term of this patent is extended or adjusted under 35 U.S.C. 154(b) by 0 days.

(21) Appl. No.: 13/867,072

(22) Filed: Apr. 20, 2013

(65) Prior Publication Data

US 2013/0332060 A1    Dec. 12, 2013

Related U.S. Application Data

(60) Division of application No. 13/153,429, filed on Jun. 5, 2011, now Pat. No. 8,447,463, which is a continuation-in-part of application No. 12/028,262, filed on Feb. 8, 2008, now Pat. No. 7,957,900.

(51) Int. Cl.
| | |
|---|---|
| *G06F 11/30* | (2006.01) |
| *G08G 1/14* | (2006.01) |
| *G06F 17/00* | (2006.01) |
| *G06Q 10/08* | (2012.01) |

(52) U.S. Cl.  
CPC .............. *G06F 17/00* (2013.01); *G06Q 10/087* (2013.01)

(58) Field of Classification Search  
USPC ............................. 701/32.3; 340/932.2, 990  
See application file for complete search history.

(56) References Cited

U.S. PATENT DOCUMENTS

| | | | |
|---|---|---|---|
| 5,978,744 | A | 11/1999 | McBride |
| 6,163,278 | A | 12/2000 | Janman |
| 6,366,242 | B1 | 4/2002 | Boyd et al. |
| 6,650,250 | B2 | 11/2003 | Muraki |
| 6,885,312 | B1 | 4/2005 | Kirkpatrick |
| 7,076,409 | B2 | 7/2006 | Agrawala |
| 7,091,902 | B2 | 8/2006 | Liu et al. |
| 7,098,793 | B2 | 8/2006 | Chung |
| 7,277,572 | B2 | 10/2007 | McInnes |

(Continued)

FOREIGN PATENT DOCUMENTS

| | | |
|---|---|---|
| JP | 09-212799 | 8/1997 |
| JP | 11-144195 | 5/1999 |

(Continued)

*Primary Examiner* — Thomas G Black  
*Assistant Examiner* — Tyler Paige  
(74) *Attorney, Agent, or Firm* — Robert W. J. Usher

(57) ABSTRACT

A computer implemented method for displaying on a map a definitive image of precise locations of multiple mobile objects such as vehicles in a lot. The lot is mapped digitally to display precise locations of sub-areas of different types, such as parking and movement slots and their raw, approximate distances from vehicles are determined from approximate coordinates of vehicles obtained remotely. A data base of vehicle and sub-area types is established and a vehicle placement matrix is determined providing probabilities of respective sub-areas being occupiable by respective vehicles derived from business environment rules based on compatibilities of respective vehicle types with respect sub-area types. Raw, approximate distances of vehicles from sub-areas are divided by the probabilities to provided adjusted distances, sub-areas ranked by least adjusted distances and the respective vehicles placed in their top ranked sub-areas for more accurate display of location on a GUI.

5 Claims, 17 Drawing Sheets

(56) References Cited

U.S. PATENT DOCUMENTS

| | | |
|---|---|---|
| 7,312,752 B2 | 12/2007 | Smith et al. |
| 7,619,542 B2 * | 11/2009 | Riesco Prieto et al. .... 340/932.2 |
| 7,893,848 B2 * | 2/2011 | Chew ......................... 340/932.2 |
| 7,948,399 B2 * | 5/2011 | Tomita et al. ............... 340/932.2 |
| 8,447,463 B1 * | 5/2013 | Chowdhary et al. ......... 701/32.3 |
| 2002/0128769 A1 | 9/2002 | Ghazarian |
| 2002/0163443 A1 | 11/2002 | Stewart et al. |
| 2002/0171562 A1 * | 11/2002 | Muraki ....................... 340/932.2 |
| 2005/0040232 A1 | 2/2005 | Maloney |
| 2005/0125284 A1 | 6/2005 | Fairbaugh |
| 2007/0008129 A1 | 1/2007 | Soliman |
| 2007/0057817 A1 | 3/2007 | Aman |
| 2007/0109134 A1 | 5/2007 | Dugan |
| 2007/0171069 A1 | 7/2007 | Allen ......................... 340/572.1 |
| 2008/0042844 A1 | 2/2008 | Christopher ............... 340/572.4 |

FOREIGN PATENT DOCUMENTS

| | | |
|---|---|---|
| JP | 2000-099894 | 4/2000 |
| JP | 2002-133593 | 5/2002 |
| JP | 2003-168196 | 6/2003 |
| JP | 2003-288421 | 10/2003 |
| JP | 2004-246484 | 9/2004 |
| JP | 2005-242701 | 9/2005 |

* cited by examiner

TRACKING VEHICLE LOCATIONS IN A PARKING LOT FOR DEFINITIVE DISPLAY ON A GUI

RELATED APPLICATION

This is a continuation-in-part application of Ser. No. 12/028,262 filed Feb. 8, 2008 by Chowdhary and Chaudhry, the present applicants. The disclosure of the parent application is incorporated herein by reference.

FIELD OF THE INVENTION

The invention relates to tracking vehicle positions in a parking lot for definitive display on a GUI for the purposes of inventory management and inventory security.

BACKGROUND OF INVENTION

In the automotive and storage and distribution industries, effective inventory management applications are critical to daily operations, where locating vehicles, trailers, or other mobile inventory accurately and in a timely manner is critical to business success.

At automotive dealerships, both sales and service employees routinely search for vehicles. If a salesperson cannot locate a vehicle for a prospective customer to test drive within a timely manner, the salesperson is less likely to sell a vehicle. On the service side, since a service technician bills customers for time spent repairing a vehicle, any time spent locating a vehicle is lost revenue. If vehicles could be found more quickly, more technician time would be spent repairing vehicles, which would increase the revenue per service technician for the dealership. In the retail automotive industry, lost vehicle sales and inefficient use of labor are the costs of not locating vehicles accurately and quickly.

In the storage and distribution industry, distribution centers maximize revenue by quickly transloading containers to trailers, splitting container loads amongst multiple trailers, and returning containers back to ports in a timely manner. Centers are typically penalized for delays, and earn more business from retailer and other customers if they are consistently on-time. Similarly, warehouses maximize revenue by quickly tracking boxes and pallets for packing and shipping. Locating mobile objects such as trailers, containers, boxes, and pallets accurately and quickly is critical to performing any of these tasks.

In fact, in both the automotive and storage and distribution industries, the problem of locating mobile objects increases in difficulty as a function of the total number of objects in inventory and the number of possible locations.

Currently, inventory management applications display the location information in a graphical form (on a GUI) of single or multiple objects by showing an image, (typically a dot or other image representing the object), against a background image of an entire map of the storage facility. Multiple objects showing multiple images are not used often because of the difficulty of interpreting raw location information from multiple objects, simultaneously. The object image is placed on the digital map on the basis of raw (x,y,z) coordinates generated through one or multiple underlying object location technologies, including GPS, RFID, RF, Ultrasonic, Acoustic, Infrared, and other technologies.

Depending on the precision of the underlying location technology, there is a resulting error radius which is expected to circumscribe the actual location of the object. This error radius may vary based on environmental constraints, including signals being blocked by walls, buildings, other objects, or inclement weather. A user is expected to extrapolate the most likely actual location of the object, based on the dot image and the error radius.

However, particularly when groups of vehicles or other objects are crowded together, the inherent location errors may result in multiple overlaps and fuzzy images which can be difficult to interpret by an observer and lead to errors in guessing actual locations which become time consuming and costly.

For example, in a parking lot, if the vehicle being sought is blocked by 2 other vehicles, an accurate multiple object display of all vehicles would prepare the user to take the keys of all 3 vehicles in order to retrieve the vehicle being sought in a single step. Alternatively, in a single object display, the obstructing vehicle would not be displayed and it would have been necessary for the user to have physically gone to the vehicle, noted the 2 vehicles that are blocking the vehicle being sought, returned to the building to pick up all 3 keys, and then returned to the vehicle to retrieve it, requiring an additional round trip.

Similarly, in a warehouse, if a user is searching for a single product that is on one of multiple pallets located throughout the warehouse, the user can choose to retrieve the pallet that is least encumbered by other pallets. Alternatively, in a single object display, the user would arbitrarily choose a pallet, possibly requiring unnecessary time and work to move other pallets out of the way before being able to retrieve the pallet being sought.

Furthermore, in traditional location technology systems that use principles of triangulation, trilateration or multilateration, all reference points used in determining the position of an object are assigned equal priority.

For example, when an object is located via GPS, the GPS receiver monitors satellite messages without any specific priority assigned to one satellite over another. All information compiled from reference points is assumed to have a high level of precision. In particular, satellites continually transmit messages that include the time the message was transmitted and precise orbital information. When a receiver receives a message from a satellite, the receiver determines transit time which is directly correlated to the distance from the satellite. The basis of calculating transit time relies on a high precision, synchronized clocking system and the universal speed constant of light.

The methodology of treating all reference points with equal priority may work for certain location technology systems where there is a high level of innate precision throughout stemming from the technology used and the basic laws of physics.

However, an example of a location technology system where assigning equal priority to reference points is not favorable is a sensor network where received signal strength or power, as measured in dBm, of multiple radio signals are inputs in a trilateration algorithm. Current approaches assign equal priority to all reference points, but because signal strength received from a reference point is intrinsically fuzzy, calculations of precise location are challenging. Many significant obstacles are encountered: radio signals exhibit exponential decay and suffer/experience reflection, interference, attenuation or general noise. These problems are exacerbated by the environment where the location technology system is situated, for example, variable ambient air quality—variations in air-borne particulates and in humidity. Furthermore, at automotive dealership premises, there can be RF reflection from a vehicle's metal panels and pillars, frequency interference from WIFI and other radio/electromagnetic wave signals, and signal attenuation from physical/mechanical obstructions (e.g. walls, equipment). Although, GPS signals may also experience from some of these obstacles, they do not suffer from an exponentially decaying radio signal of 2.4 GHz, illustrated, for example in FIG. 15, (RFID transmitter).

The received signal strength (RSSI) is a function of the transmitted power and the distance between the reference point/sender and the receiver. The received signal strength will decrease with increased distance as the equation below shows.

$$RSSI = -(10n \log_{10} d + A)$$

n: signal propagation constant, also named propagation exponent (empirically generated)

d: distance from sender/transmitter

A: received signal strength at a distance of one meter (empirically generated)

As can be seen from the graph, the further a receiver is from a reference point the less variance there will be in RSSI. This decay, coupled with imprecision arising from reflection, interference, attenuation or general noise, greatly reduce accuracy.

SUMMARY OF THE INVENTION

It is an object of the invention to ameliorate or eliminate the above-mentioned disadvantages by providing, automatically, a definitive/accurate, real time, GUI display of respective positions of the multiple vehicles or other multiple objects on the map of a parking lot or mobile object facility.

An additional object of the invention is to factor in the unique characteristics of particular location technology systems and thereby significantly improve the accuracy of an object's position by assigning different priorities to respective reference points.

Accordingly, the invention provides a computer implemented method to automatically track/identify respective parking slots and movement slots occupied by respective individual vehicles of a group of vehicles crowded together in a parking lot to enable definitive, real time, display of the vehicles' respective parking and movement slots on a GUI, comprising the steps of:

determining a set of business environment rules based on compatibility of respective slots with respective vehicles for providing relative probabilities of occupation of respective slots by respective vehicles;

determining raw distances of respective vehicles from respective slots;

adjusting values of raw distances of respective vehicles from respective potential slots according to the respective probabilities of occupiability as determined by the business environmental rules so that the relative proximities of slots to respective vehicles increase with increasing probabilities of occupationiability as compared with relative proximities derived from the raw distances;

ranking the respective slots in order of most proximate to respective vehicles, as derived from the adjusted values of raw distances and, placing respective vehicles in respective top ranked slots for real-time display on a GUI and, so that any slot occupying vehicles are replaced by more proximate vehicles and replaced vehicles are then placed in successively ranked slots.

Thus, once information concerning any different types and/or physical states of vehicles and different types of slots and the applicable business rules are established and entered on the data base, the locations of vehicles and other mobile objects in the lot can be tracked in real time and displayed definitively on the computer GUI automatically, without need for additional user estimation or interpretative guesswork.

The invention also provides a computer implemented method to automatically track/identify respective locations occupied by respective individual vehicles of a group of vehicles crowded together in a parking lot to enable definitive, real time, display of the vehicles' respective locations on a GUI, comprising the steps of:

a) creating a digital map of a main area of a parking lot by identifying sub-areas of the parking lot of different types comprising parking slots and movement slots, potentially occupiable by vehicles; dividing the parking lot into a grid of cells so that respective slots are filled by at least one cell with each cell being in only a single slot;

b) determining a business environment rule for each type of slot based on vehicle compatibility which provides a probability that a slot of a particular type is occupiable by a vehicle;

c) determining precise positional coordinates of respective parking slots and movement slots;

d) providing means for remotely identifying respective vehicles and for providing approximate positional coordinates of each vehicle identified;

e) designating a vehicle and comparing the approximate positional coordinates of said designated vehicle with the precise positional coordinates of each slot, as provided by the digital map, to determine respective raw distances therebetween;

f) calculating adjusted distances of the designated vehicle from respective slots by changing values of respective raw distances by a factor dependent on relative probabilities of respective slots being occupiable by the designated vehicle according to the business rule, so that relative proximities of respective slots to the designated vehicle are increased with increasing probability, by comparison with relative proximities derived from respective raw distances;

g) ranking the slots in order by least adjusted distances from the designated vehicle and, in the event of slots having equal highest ranking, assigning a top rank to one of those equal highest ranking slots by one of random selection and other criteria;

h) when the top ranked slot is unoccupied by another of the vehicles, placing the designated vehicle in the top ranked slot and, when the top ranked slot is occupied, comparing the adjusted distance of the designated vehicle from the top ranked slot and the adjusted distance of the occupying vehicle from the top ranked slot and placing the more proximate of those vehicles in the top ranked slot;

i) when the designated vehicle is not more proximate than the occupying vehicle repeating step h) for successively ranked slots until one of the designated vehicle is placed in a slot and all attempts to place the designated vehicle are exhausted;

j) when the designated vehicle is more proximate than the occupying vehicle, replacing the occupying vehicle by the designated vehicle so that the occupying vehicle returns to the group; and, k) repeating the steps e)-j) for all remaining vehicles of the group.

Business rules may be based, for example on the size and type, temperature or velocity of vehicle or mobile object, and the corresponding size and type of potential slots or sub-areas in the vehicle or mobile object proximity.

For example, where a box is the mobile object and its approximate/raw (x,y,z) coordinate would place it in mid air, the probability based adjustment provided by the invention would place an image of a box on the most likely shelf (a pre-defined sub-area).

Similarly, where a vehicle is the mobile object and its approximate/raw (x,y,z) coordinate would place it on a curb, in a building, or overlapping another vehicle, the invention would place an image of the vehicle in the most likely parking slot. Further, the invention will not place a large trailer in a small vehicle parking slot, or a vehicle that is in-motion in a parking slot.

The invention provides the advantages of increasing the accuracy of the location estimate of the mobile object; decreasing the time required to actually physically locate the object, and reducing the burden on the user to interpret location results. In particular, the last mentioned advantage reduces the required acumen and burden of pro-activity of a user to physically locate objects.

The invention enables respective locations of groups of mobile objects crowded together to be displayed clearly, simultaneously, and in real-time. In a variety of applications, this allows users to use other displayed objects as relative landmarks when physically in the lot, locating the desired vehicle, and also prepares the user to negotiate other objects that are obstructing access to a desired object.

The invention also enables users to view available or unoccupied sub-areas on the map—available shelf space, open parking slots, etc.

It will be appreciated that mobile objects to be tracked include vehicles, trailers, shipping containers, shipping pallets, mobile hospital equipment, or other classes of mobile equipment. Pre-specified areas include parking lots, airports, seaports, wharfs, warehouses, campuses, hospitals, distribution centers, battlefields, or other pre-specified areas. Sub-areas include parking slots, rooms, alcoves, bays, cells, lockers, docks, shelves, stalls, or subdivisions.

The method of the invention bridges the gap between various location technologies, such as GPS, RF, RFID, Ultrasonic, Acoustic, Infrared, and other technologies, which generate a raw (x,y,z) coordinate for a single, specific object, and a graphical user interface (GUI), where multiple objects are displayed in a parking slot, room, area, or other discrete sub-area on a digital map.

According to another aspect, claimed in the parent application, the invention provides a method for improving mobile object resolution in a real time simultaneous display of multiple mobile objects in specific sub-areas of a facility area on a GUI comprising the steps of:

measuring approximate respective distances of respective mobile objects from respective potentially occupiable specific sub-areas;

formulating at least one business environment rule based on relative compatibilites of respective objects with respective sub-areas indicative of relative probabilities of respective objects being found in respective sub-areas;

modifying the measured distances in accordance with the relative probabilities to provide respective adjusted distances; and, placing respective mobile-objects in respective sub-areas located at least adjusted distances therefrom for display in the facility area on the GUI.

As mentioned above, another object of the invention is to obtain increased accuracy in the measurement of approximate respective distances of respective mobile objects from respective potentially occupiable specific sub-areas by factoring in the unique characteristics of particular location technology systems and thereby significantly improve the accuracy of an object's position by assigning different priorities to respective reference points.

Such object may be achieved by the introduction of a predetermined matrix of reference points, referred to herein as a 'neighbor graph' generated by pre-mapping a selected area, and the approximate distance of an object from a primary reference point.

DESCRIPTION OF PARTICULAR EMBODIMENT

The implementation of the invention in this embodiment comprises two main stages: first, the configuration of overall lot area, sub-areas, lots and vehicles or mobile objects; and second, the placement of vehicles or mobile objects based on raw (x,y,z) coordinates as adjusted by business environment rules based on sub-area and mobile object compatibility, for definitive display on a screen at improved resolution.

Figure 1:
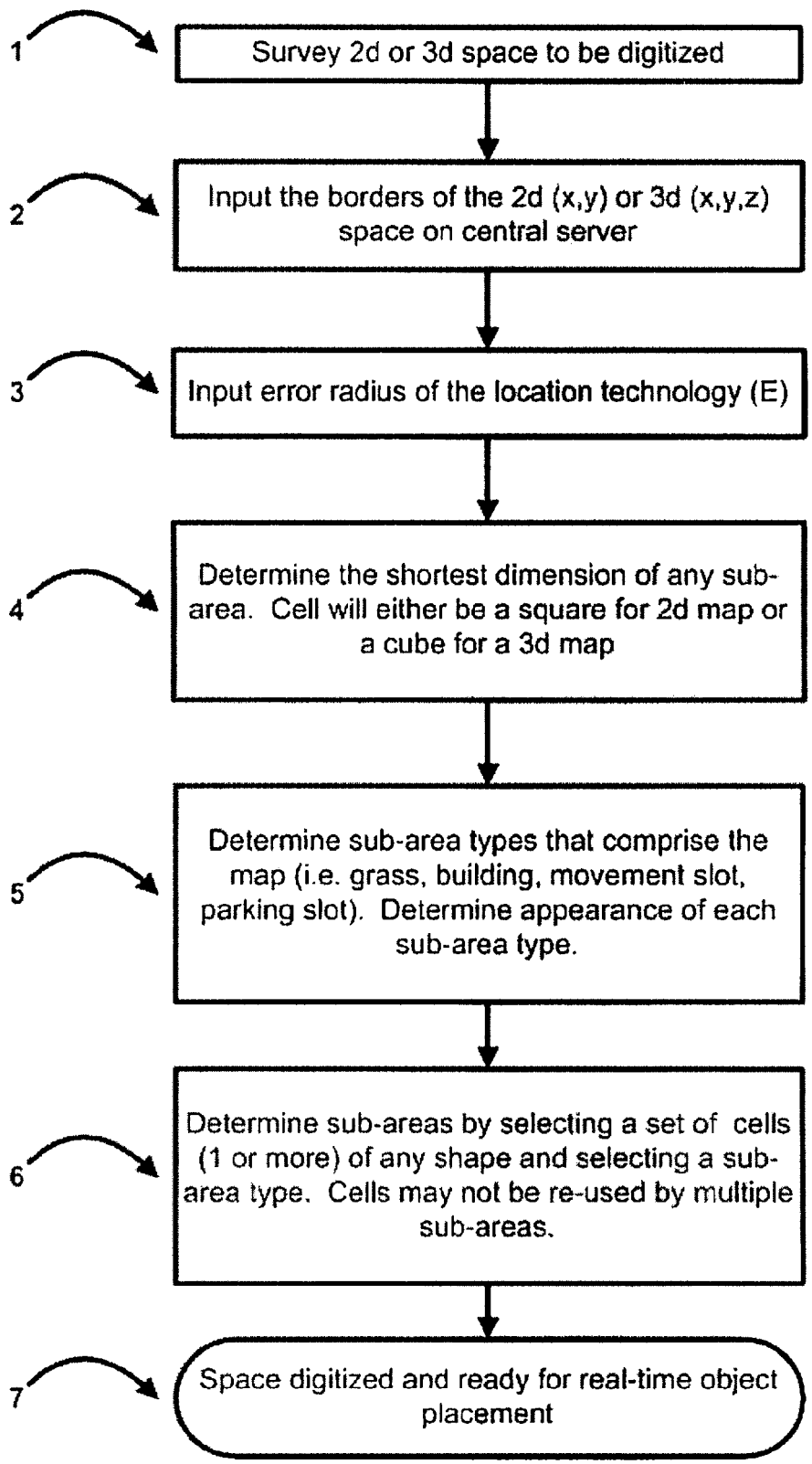
FIG. 1 is a flow chart showing the steps involved in providing a digital map of a parking lot or other mobile object facility.

Firstly, as shown in FIG. 1, at step 1, the (2 or 3 dimensional) parking space to be digitized is surveyed. The borders of the space are then input on a central server at step 2. At step 3, the error radius E of the vehicle location technology is input. At step 4 the shortest dimension of any sub-area is input for determining minimum required individual cell size. (Cell will have square or cube shape for 2D or 3D map). At step 5, the various different physical types of the sub-areas are determined, (grass, building, movement slot, parking slot), together with the appearances. At step 6, one or more groups/sets of cells are selected to define individual sub-areas/slots and, at step 7, the space is digitized and ready for real-time vehicle/object placement.

Figure 2:
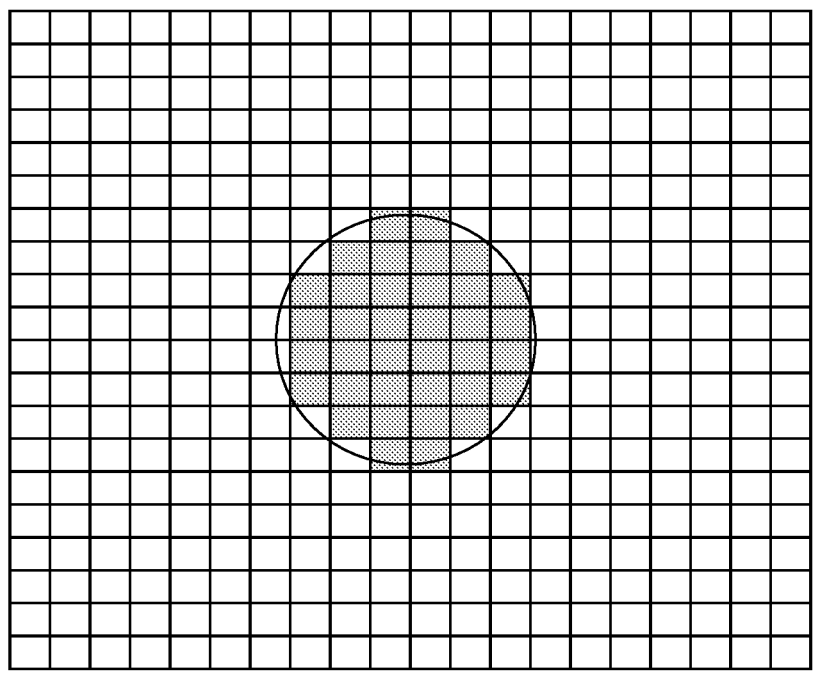
FIGS. 2 and 3 show, respectively, circular sub-areas defined by cells of larger and smaller sizes, respectively.

The implementation of the above steps will now be explained in greater detail:

First, the user specifies the overall area dimensions (x,y,z), the precision of the vehicle location technology (E), and the shortest dimension of any sub-area to be defined in the system. Accordingly, a grid representing the pre-specified area, with each grid cell sized to meet the shortest dimension of any sub-area is generated. For example, if a user plans to depict a 40 square meter circular grass area in the middle of an overall 2 dimensional area measuring 400 square meters, the user could specify the shortest dimension as either 1 meter, as in FIG. 2, or as 0.25 meters, in FIG. 3. Clearly, when specifying a shorter "shortest dimension of any sub-area", a user can create more realistic non-square sub-area shapes.

Figure 3:
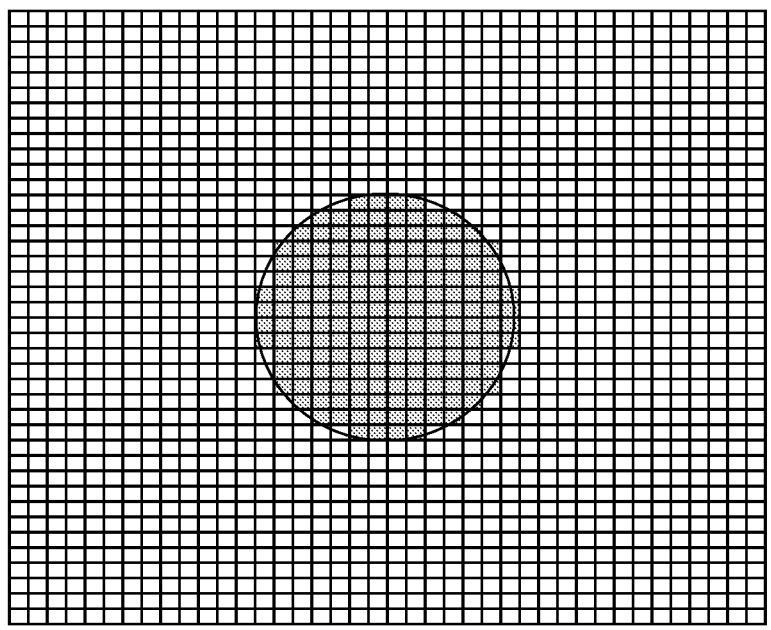
Figure 4:
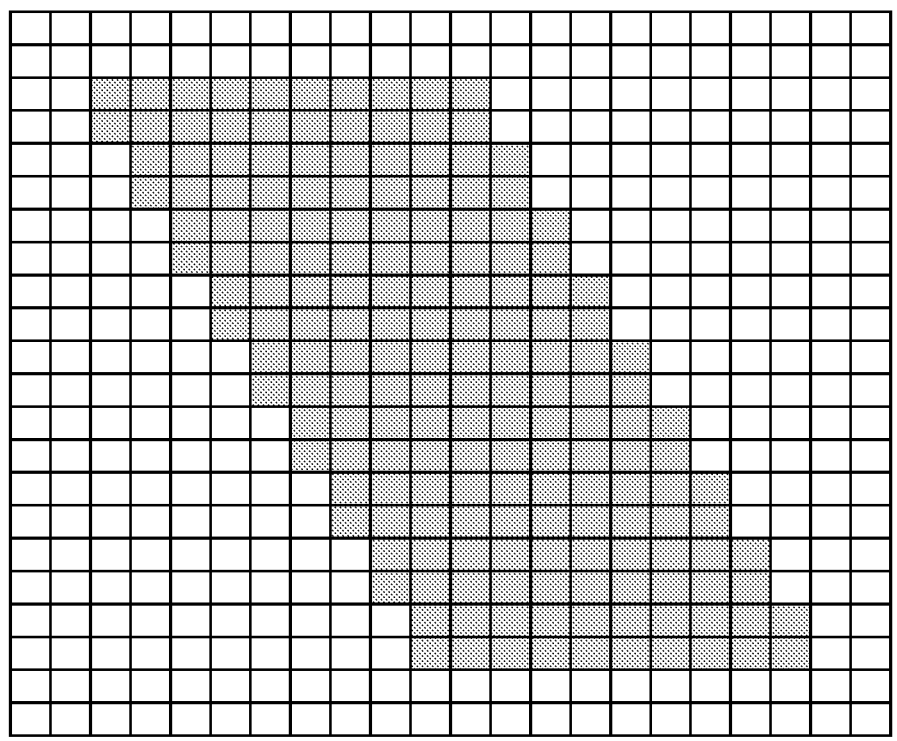
FIG. 4 shows a diagonally extending, parallelogram shape, sub-area as a parking slot defined by cells.
Figure 5:
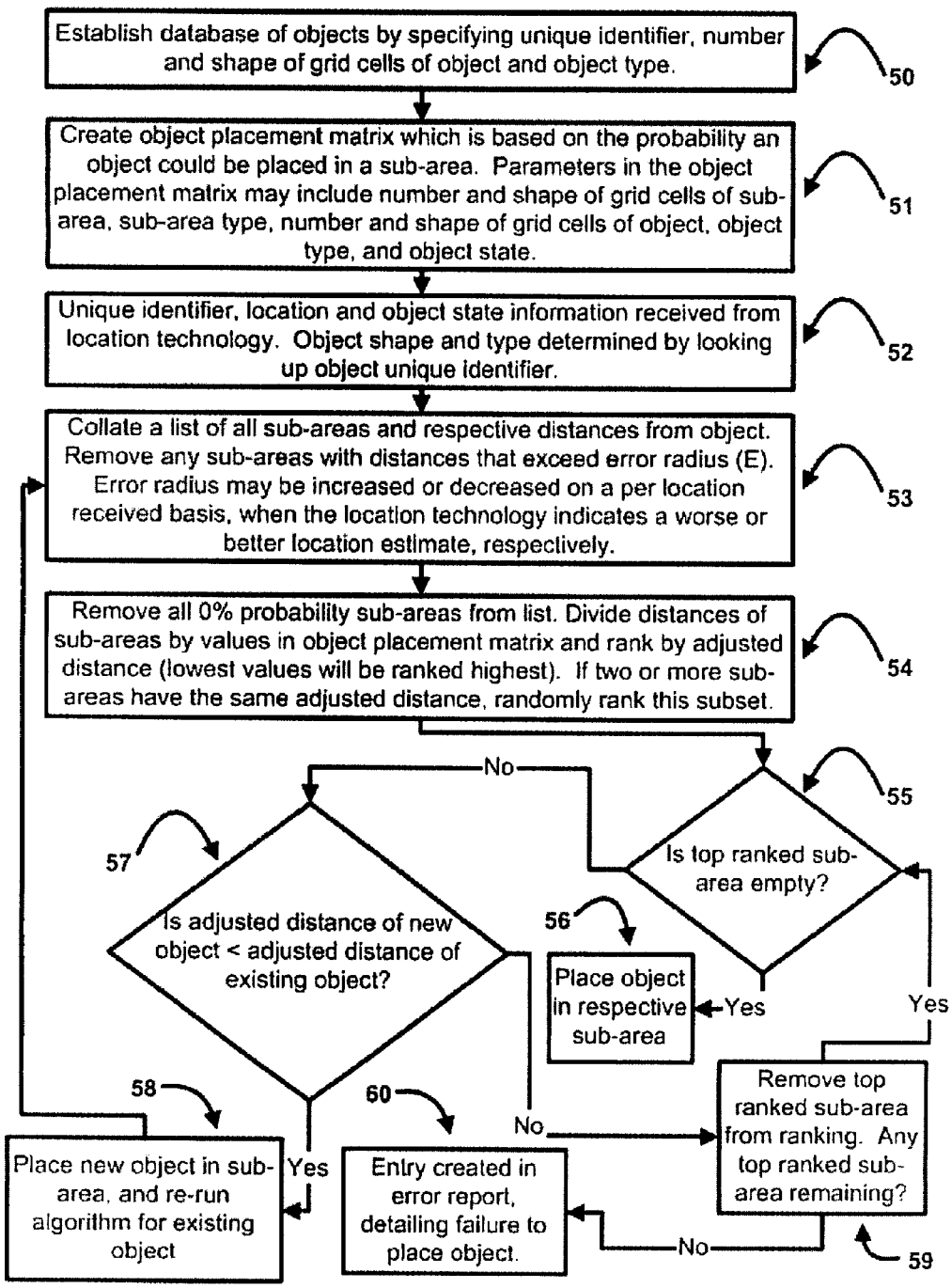
FIG. 5 is a flow chart showing the steps involved in placing respective vehicles or other mobile objects in respective sub-areas or parking slots
Figure 6:
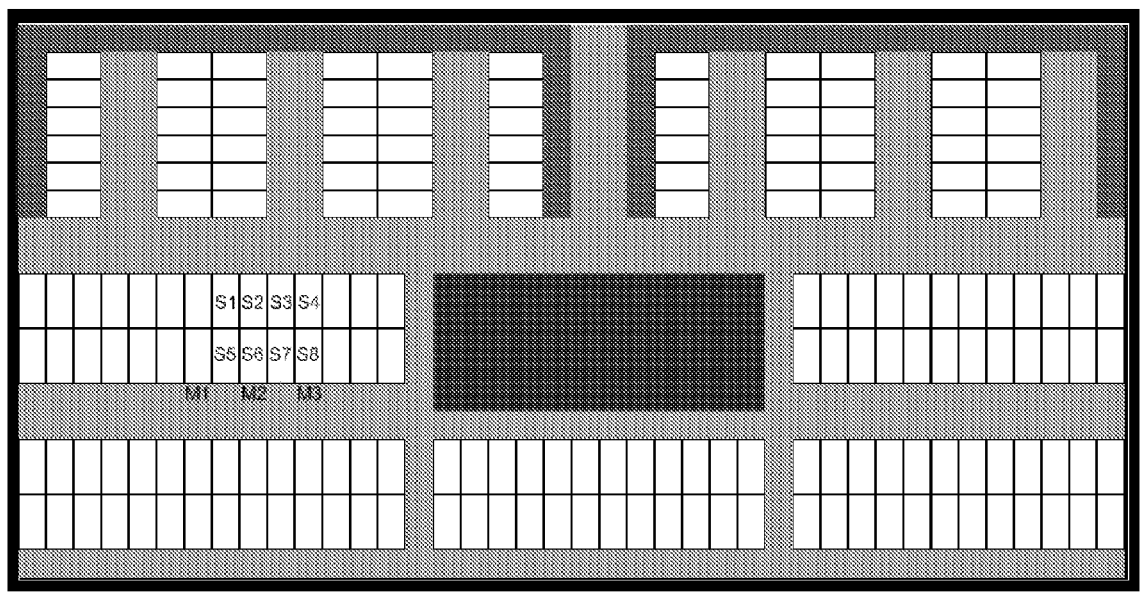
FIG. 6 is a plan/map of a portion of a parking lot.
Figure 7:
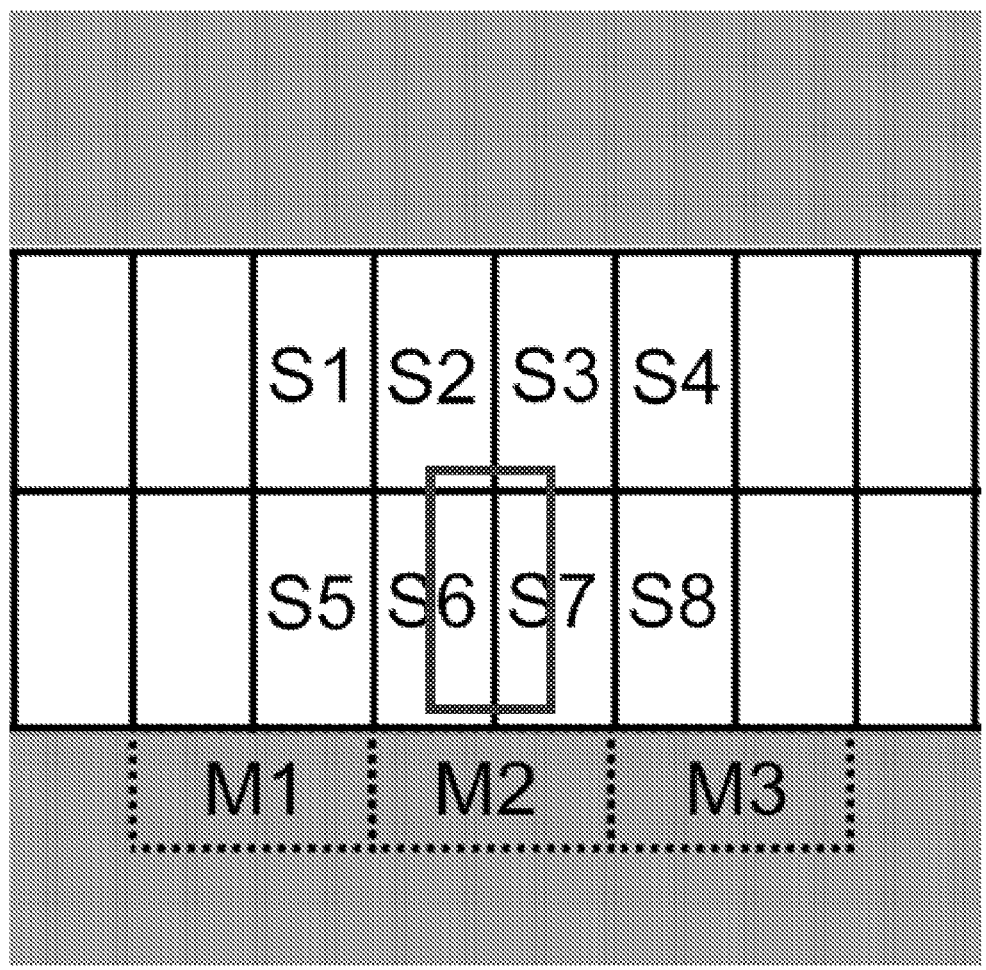
FIG. 7 is an enlarged view of a portion of the parking lot, showing the position of a first car is it would potentially appear on a display before adjustment by the business rules.

Next, sub-areas are defined based on the shape of one or more grid cells, sub-area type, and sub-area appearance. Large sub-areas may take up multiple cells and have irregular shapes. For example, in a 2 dimensional grid representing a parking lot, a diagonal parking space is shaped as a parallelogram and occupies a total of 20 total cells, as shown in FIG. 3. Sub-areas are further defined by a specific type. For example, a sub-area may be characterized as a "refrigerated" area, "10 ft restricted ceiling" area, or as a non-usage" area. In the example below, the sub-area is a "parking" slot (as opposed to a "moving" slot). Sub-areas are also defined by appearance (which may be an image specified by the user), and will be depicted on screen accordingly. On the screen, the parking space will appear light gray in color with four white lines outlining the four corners so that it appears to have smooth, not jagged sides.

Typically, a parking slot is 10 feet wide and 18 feet long. Each grid cell represents 1 foot. Thus, this diagonal parking space is 10 cells in width, by 18 cells in length.

Prior to placing or assigning mobile objects (vehicles) to parking slots/sub-areas, as indicated in Figure 50, a database of mobile objects identity and characteristics is established.

As indicated at 51, an object placement matrix of the probability that an object (vehicle) could be based in a sub-area, based on business environment rules of compatibilities of sub-areas with objects is determined.

As indicated at 52, for a designated vehicle, the identity, approximate location and state is received from the location technology (e.g RFID or GPS), As indicated at 53, a list of all eligible sub-areas/slots is collated and their (raw) distances from the vehicle determined, (omitting or removing those outside the selected error radius E).

As indicated at 54, the respective raw distances of the sub-areas/slots are divided by their respective probabilites of accommodating the designated vehicle according to the business rules matrix and ranked in order of closeness to the vehicle.

As indicated at 55, if the top ranked sub-are/slot is empty, the vehicle object is displayed as located in that sub-are/slot as indicated at 56, but if the sub-are/slot is occupied the adjusted distances of the designated and occupying vehicles are compared, as indicated at 57, and if the designated vehicle is closer than the occupying vehicle (less adjusted distance), the designated vehicle replaces the occupying vehicle, as indicated at 58, and the algorithm is rerun for the removed vehicle by returning to step 53. If the adjusted distance of the designated vehicle is not less than the adjusted distance of the occupying vehicle, the top ranked sub-area is removed from the list, as indicated at 59, and if any sub-areas remain, the designated vehicle is subjected to the test of 57, if the sub-area is occupied or, if unoccupied, displayed therein as indicated at 56.

If no sub-areas remain, an error repot entry is made detailing the failure to place the vehicle object as indicated at 60.

Aspects of the steps outlined above will now be described In more detail,

Vehicles or mobile objects to be placed in sub-areas are defined by shape of one or more grid cells, type, state, and object appearance. As with sub-areas, vehicle/mobile objects may take up multiple cells and have irregular shapes. Vehicle/objects are also further defined by specific types. For example, an object may require "cold-storage", be a "high priority" object. vehicle/objects are further characterized by state, which can vary over the life of a vehicle/object. For example, a vehicle/object can be "in motion", "stationary", "overheated" or "overcooled". Vehicle or object appearance is defined by an image specified by the user, and will be depicted on screen accordingly.

In constructing the object placement matrix, the user defines the likelihood of placement of an object into a sub-area based on number and shape of grid cells of sub-area, sub-area type, number and shape of grid cells of object, object type, and object state. For example, a "vehicle" object that is in the "stationary" state is highly likely to be placed in a "vehicle parking slot" sub-area, is relatively less likely to be placed in a "vehicle moving slot" sub-area, and is least likely to be placed in a "non-usage area".

Each combination of a sub-area, object, and object state is defined by a percentage likelihood of placement between 0% and 100%, for example, as shown in the matrix below:

| Object Placement Matrix - % Likelihood Object could be placed in Sub-Area | | | | |
|---|---|---|---|---|
| Sub-Areas | Large Vehicle - Stationary | Small Vehicle - Stationary | Large Vehicle - In Motion | Small Vehicle - In Motion |
| Small Parking Slot | 5% | 100% | 3% | 40% |
| Large Parking Slot | 100% | 80% | 75% | 20% |
| Small Movement Slot | 30% | 60% | 50% | 100% |
| Large Movement Slot | 60% | 40% | 100% | 80% |
| Large Grass Slot | 10% | 10% | 10% | 5% |
| Building Slot | 0% | 0% | 0% | 0% |

*Individual values are calibrated based on individual application

Objects are then registered to be tracked in the system. Each physical vehicle object to be tracked is assigned a unique identifier, and classified by object shape and type. When the location system reports an object's location and, possibly, the object's state (which varies over time based changing conditions and is measured by a sensor within the location system), it will reference the object's unique identifier.

As vehicle objects move, the location system sends 1) an object's unique identifier, 2) the updated (x,y,z) coordinates, and 3) the object "state" based on location system information.

In the placement procedure, based on the precision variable entered by the user in the configuration stage, the method of the invention will create a list of sub-areas that are within the precision radius (E) of the given (x,y,z) coordinate, based on a (raw) distance calculation between given coordinate and the centroid of the sub-area. All sub-areas, regardless of type are included in this list. Next, the distances are divided by the corresponding percentage in the object placement matrix to provide the adjusted distance. For example, if the raw distance of a large vehicle is 3 meters from a large grass slot, the adjusted distance would be 3/10%=30.

This list is now ranked in order of least adjusted distance. If multiple sub-areas have the same adjusted distance, they are ranked randomly in relation to each other or by some other criterion such as first considered.

If the top ranked sub-area is unoccupied, the object is placed in that sub-area and the placement procedure terminates. If the top ranked sub-area is occupied, the adjusted distance of the existing vehicle/object is compared with the adjusted distance to the new object. If the new vehicle/object has a smaller adjusted distance, the new vehicle/object is placed in the sub-area, and the placement procedure runs again in order to place the existing object.

If the new vehicle/object is equally close or has a greater adjusted distance, the existing vehicle object remains in the sub-area, and the new vehicle/object is attempted to be placed in the second ranked sub-area. If the second ranked sub-area is unoccupied, the vehicle/object is placed in this sub-area and the placement procedure terminates. If the second top ranked sub-area is occupied, the invention will compare the adjusted distance of the existing vehicle object to the new vehicle object. If the new vehicle/object has a smaller adjusted distance, the new vehicle object is placed in the second top ranked sub-area, and the placement procedure runs again in order to place the existing vehicle/object. If the new vehicle/object is equally close or has a greater adjusted distance, the existing vehicle/object remains in the sub-area, and placement of the new vehicle/object in the next top-ranked sub-area is attempted.

The procedure continues until the new vehicle/object has been placed and all displaced existing vehicle objects have been placed, or all sub-areas have been evaluated and an vehicle/object cannot be placed. In case a vehicle/object cannot be placed, the invention creates an entry on an error report. This indicates to the user that either the precision threshold is too small, or that the sub-areas have not been defined accurately.

In the case where the shape and size (by number of cells) of the object is equal to or smaller than the shape and size of the sub-area where the vehicle is placed, the image of the object will be placed such that it fits within the boundaries of the sub-area, such that the centroid of the image is the same as the centroid of the sub-area.

Figure 12:
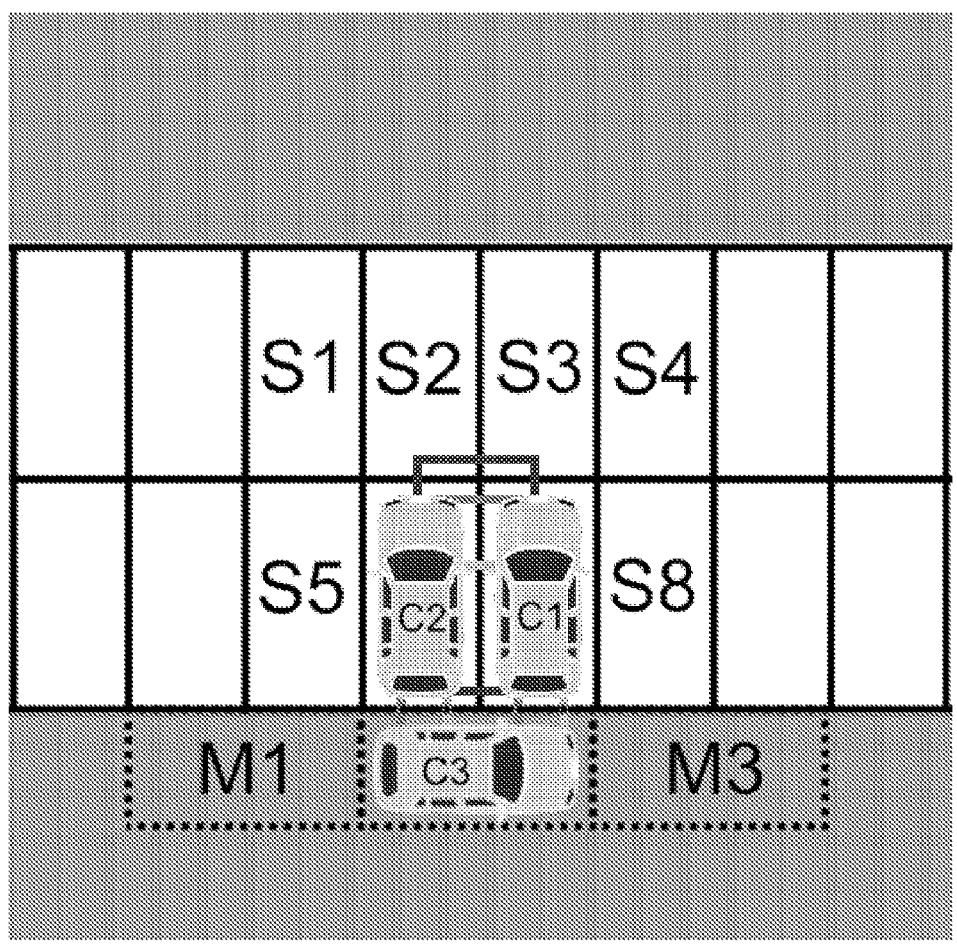
FIG. 12 is similar view to FIG. 11, showing the position of the third car as it would actually appear on a display after adjustment by the business rules.
Figure 14:
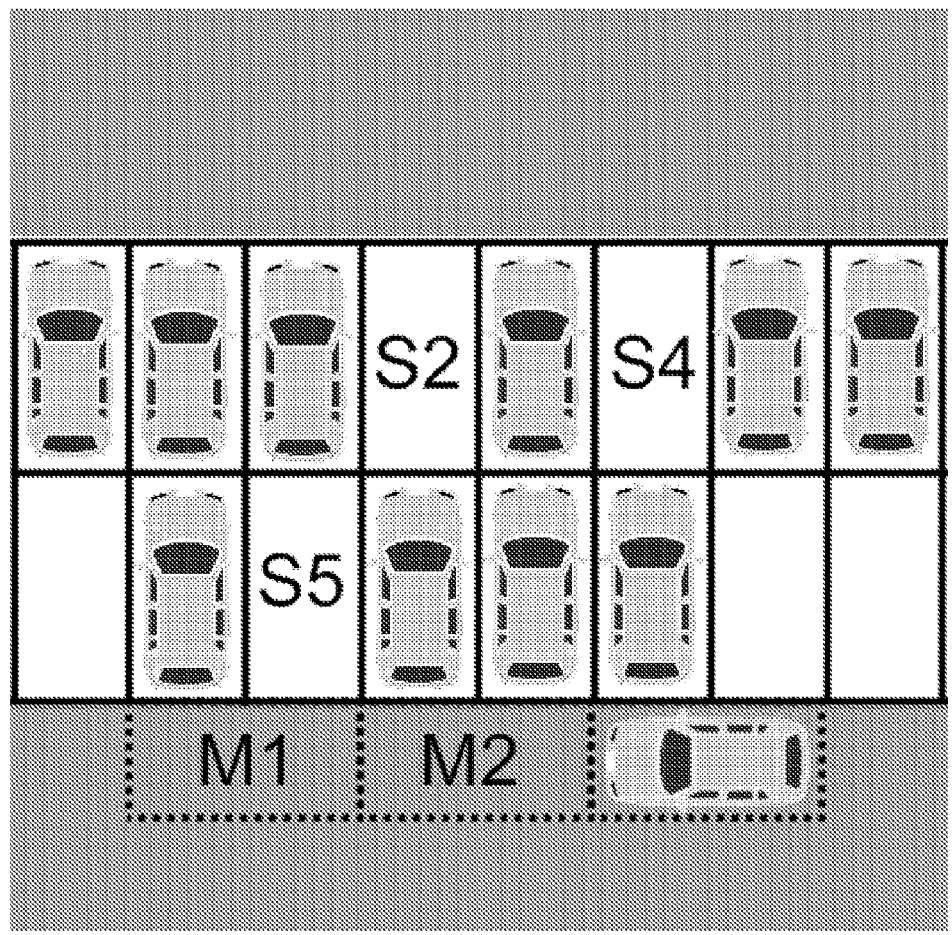
FIG. 14 is similar view to FIG. 13, showing the position of the eleven cars as it would actually appear on a display after adjustment by the business rules.
Figure 15:
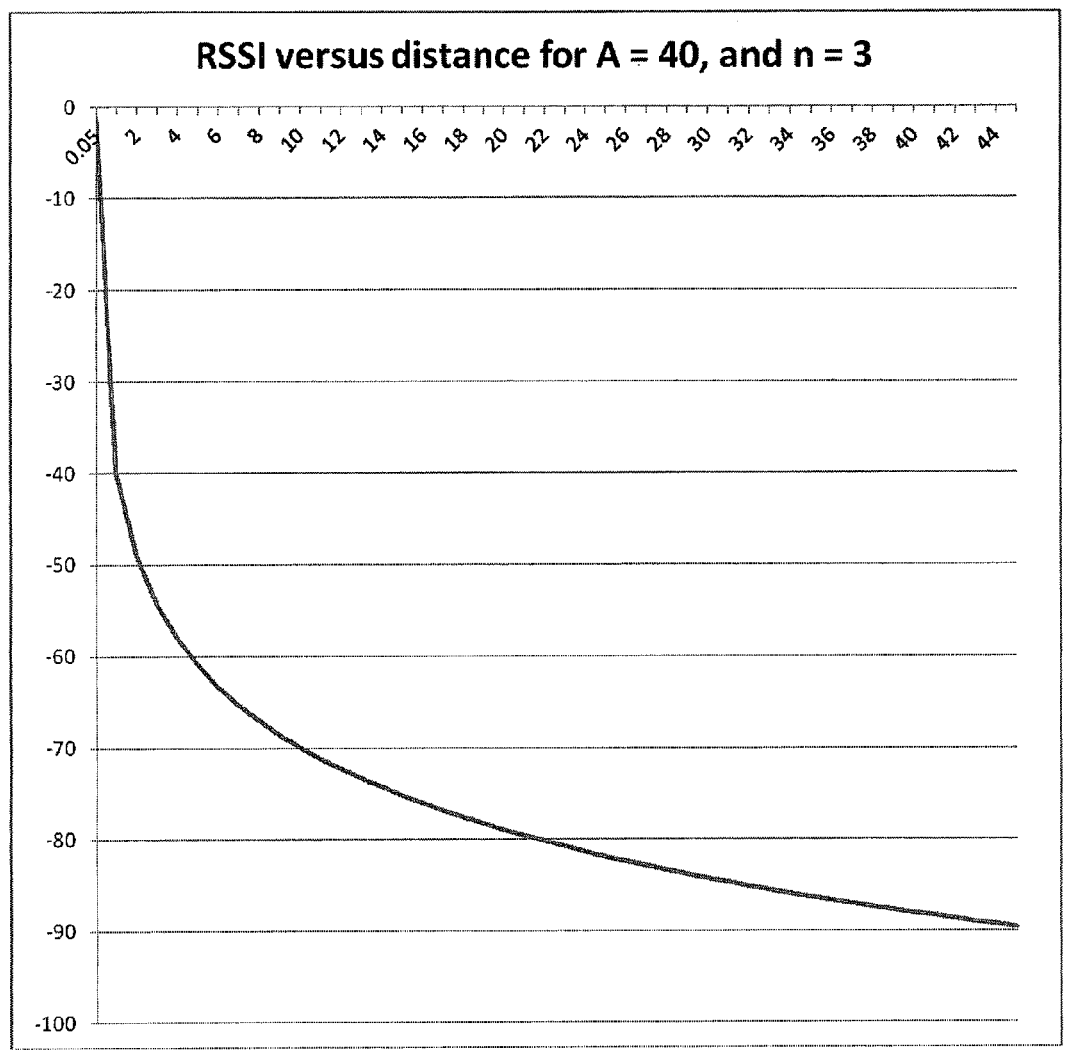
FIG. 15 is a graph showing an exponential decay curve typical of a 2.4 GHz transmission signal.

In the case where the shape and size (by number of cells) of the object is greater than the shape and size of the sub-area where the vehicle is placed, the image of the object will be placed such that it minimizes the total overhang over the boundaries of the sub-area. Thus, an elongate vehicle image will be displayed extending along the elongate movement slot as shown in FIGS. 12 and 14, as otherwise the image would overhang the slot boundary.

In the following examples, described in connection with FIGS. 6-14, the vehicle placement matrix is agnostic to vehicle size and vehicle velocity. Additionally, all sub-areas forming slots are of the same size. Only the top 2 slots (sub-areas) are considered within 25 m.

| Object Placement Matrix | | |
|---|---|---|
| Sub-Areas | Vehicle - Stationary | Vehicle - In Motion |
| Parking Slot | 100% | 100% |
| Movement Slot | 10% | 10% |
| Grass Slot | 5% | 5% |
| Building Slot | 0% | 0% |

Precise coordinates of respective parking slots S1-S8, and movement slots M1-M3, shown in FIGS. 6-14, are as follows:

Parking Slots (centroids are in meters)
S1—(180,240)
S2—(204,240)
S3—(228,240)
S4—(252, 240)
S5—(180,288)
S6—(204, 288)
S7—(228, 288)
S8—(252, 288)
Movement Slots
M1—(168, 324)
M2—(216, 324)
M3—(264,324)

Figure 8:
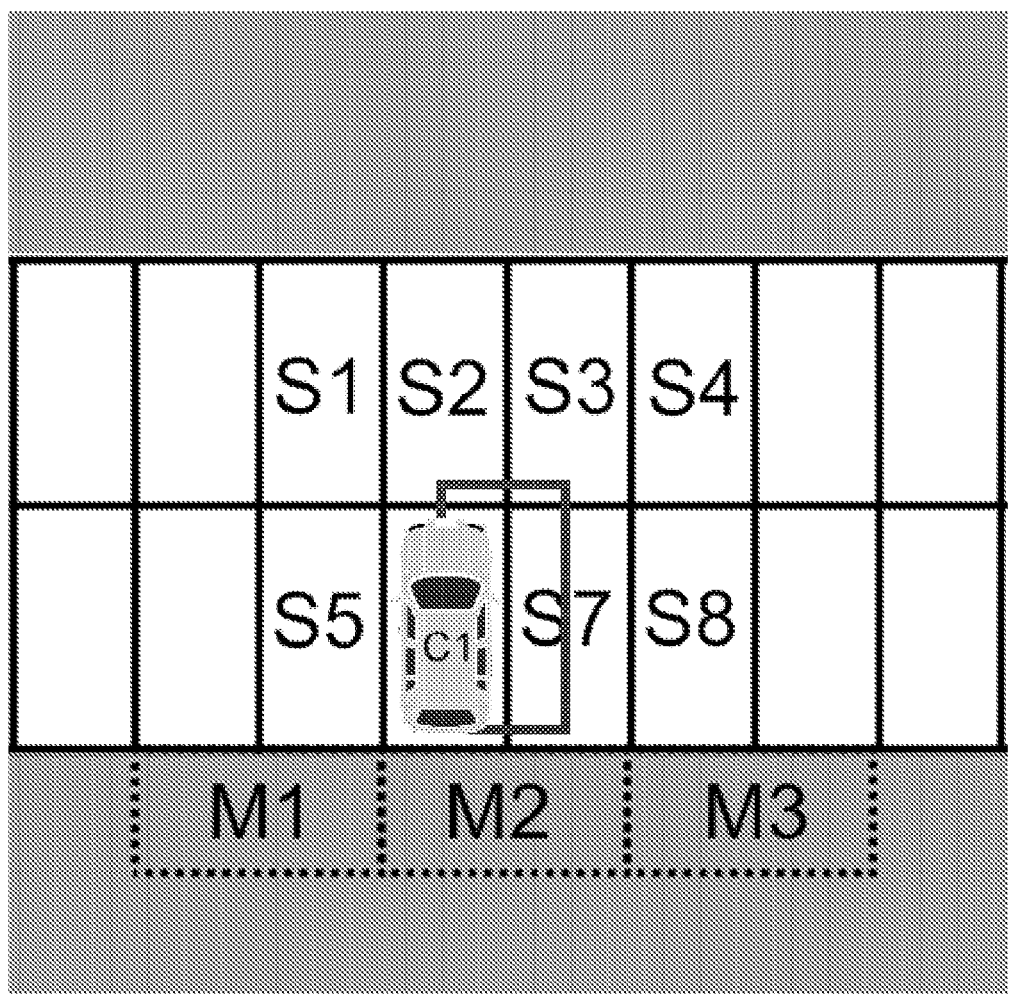
FIG. 8 is a similar view to FIG. 7, showing the position of the first car as it would actually appear on a display after adjustment by application of the business rules.
Figure 9:
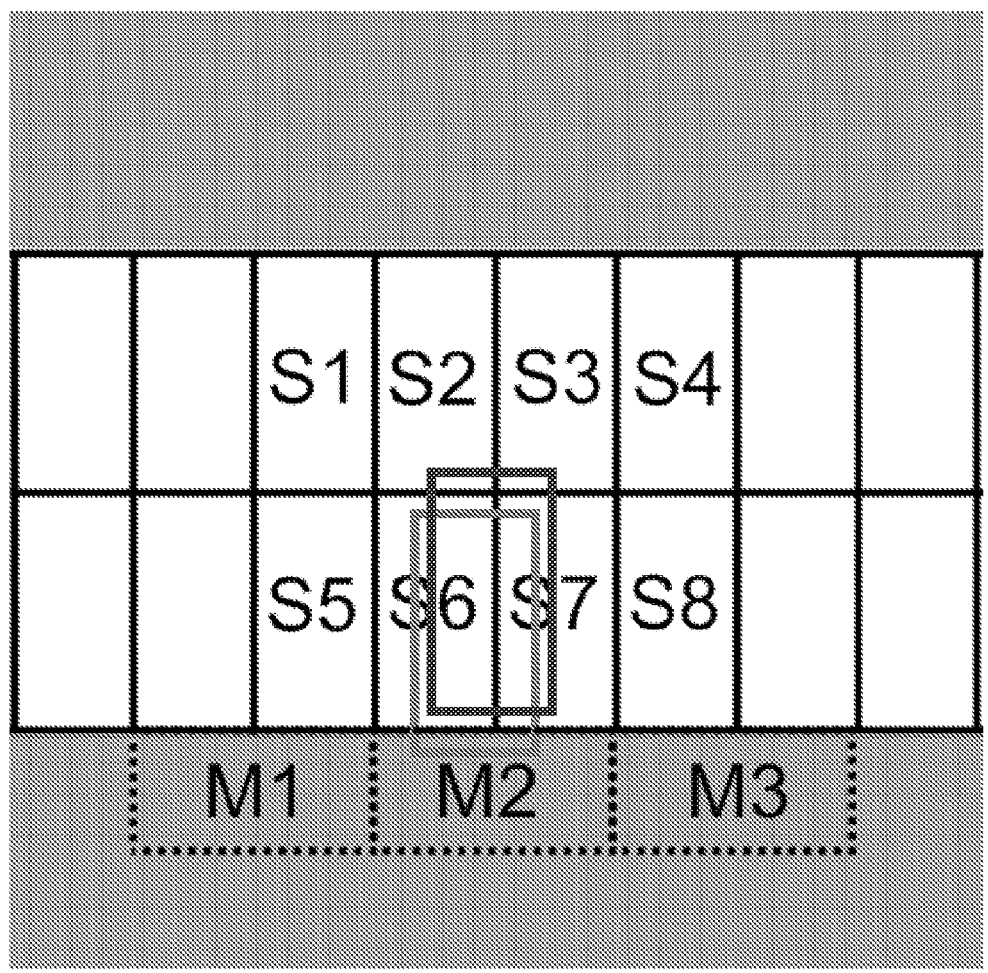
FIG. 9 is a similar view to FIG. 8, showing also the position of a second car as it would potentially appear on a display before adjustment by the business rules.

Event 1
1. Car 1 has an approximate (raw) detected location of (215, 284) which would correspond to a displayed position shown in FIG. 7 before adjustment by the business rules.
  The top 2 slots are:
  a. S6 (11.7 m adjusted distance index)
  b. S7 (13.6 m adjusted distance index)
  Car 1 therefore occupies S6, as shown in FIG. 8 as would be actually displayed on the GUI.

Figure 10:
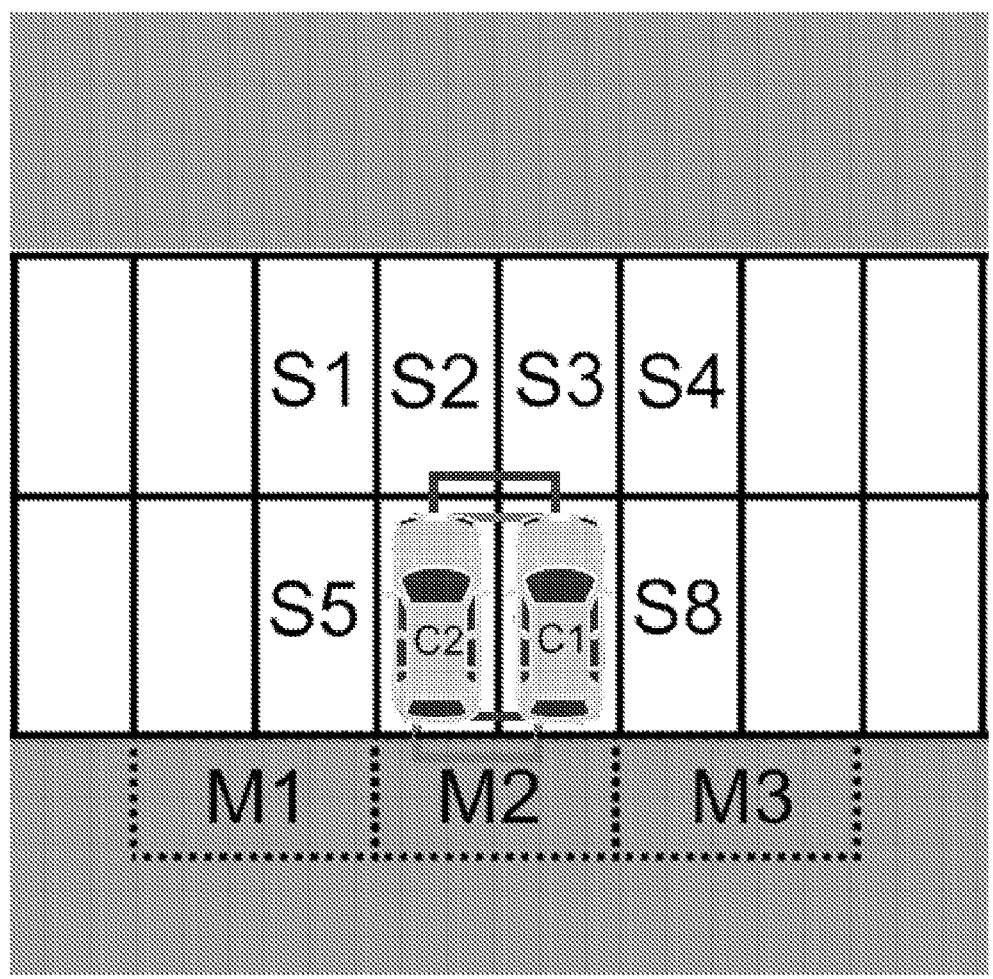
FIG. 10 is a similar view to FIG. 9, showing the position of the second car as it would actually appear on a display after adjustment by the business rules.
Figure 11:
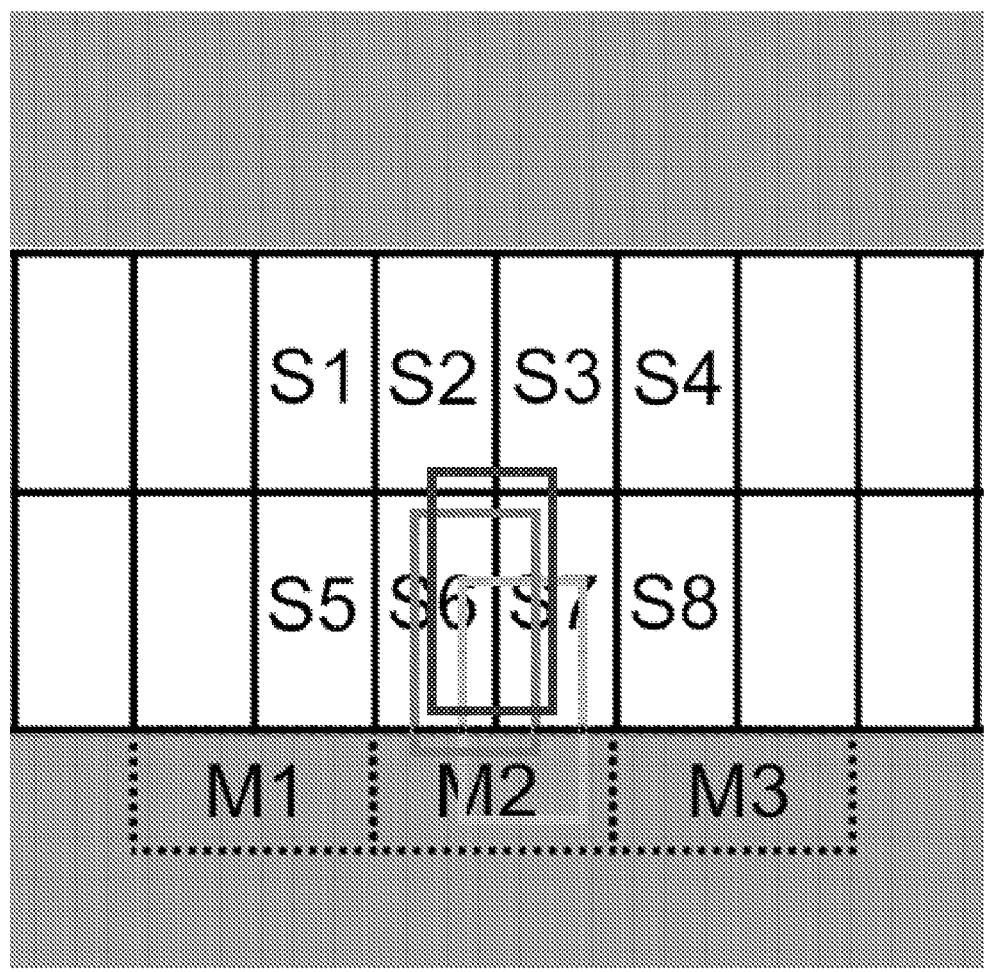
FIG. 11 is a similar view to FIG. 10, also showing the position of a third car as it potentially would appear on a display before adjustment by the business rules.

Event 2
1. Car 2 has a position of (210, 292) which would correspond to a displayed position shown in FIG. 9 before adjustment by the business rules.
  The top 2 slots are:
  a. S6 (7.2 m adjusted distance index)
  b. S7 (18.4 m adjusted distance index)
  Car 2 displaces Car 1 to occupy S6 because it has a more favorable, (higher ranking), adjusted distance index, (7.2 m<11.7 m).
Re-run Algorithm for Car 1. Car 1 has a position of (215,284).
  The top 2 slots are:
  c. S6 (occupied by Car 2 which has a more favorable adjusted distance index)
  d. S7 (13.6 m adjusted distance index)
  Therefore, Car 1 occupies S7 as shown in FIG. 10.

Event 3
1. Car 3 has position of (222,305) which would correspond to a displayed position shown in FIG. 11, before adjustment by the business rules.
  The top 2 slots are:
  a. S7 (occupied by Car 1 which has a more favorable adjusted distance index, 13.6 m<18 m)
  b. M2 (19.9 m/10%=199 m adjusted distance index)
  Therefore, Car 3 occupies M2 in the actual, real time display, as shown in FIG. 12. In practice, car images will not have any identifiable front facing direction but are aligned with slot direction.

The following 11 vehicle example shows that the utility of the invention is significant even in the setting of a small area of a larger lot.

Figure 13:
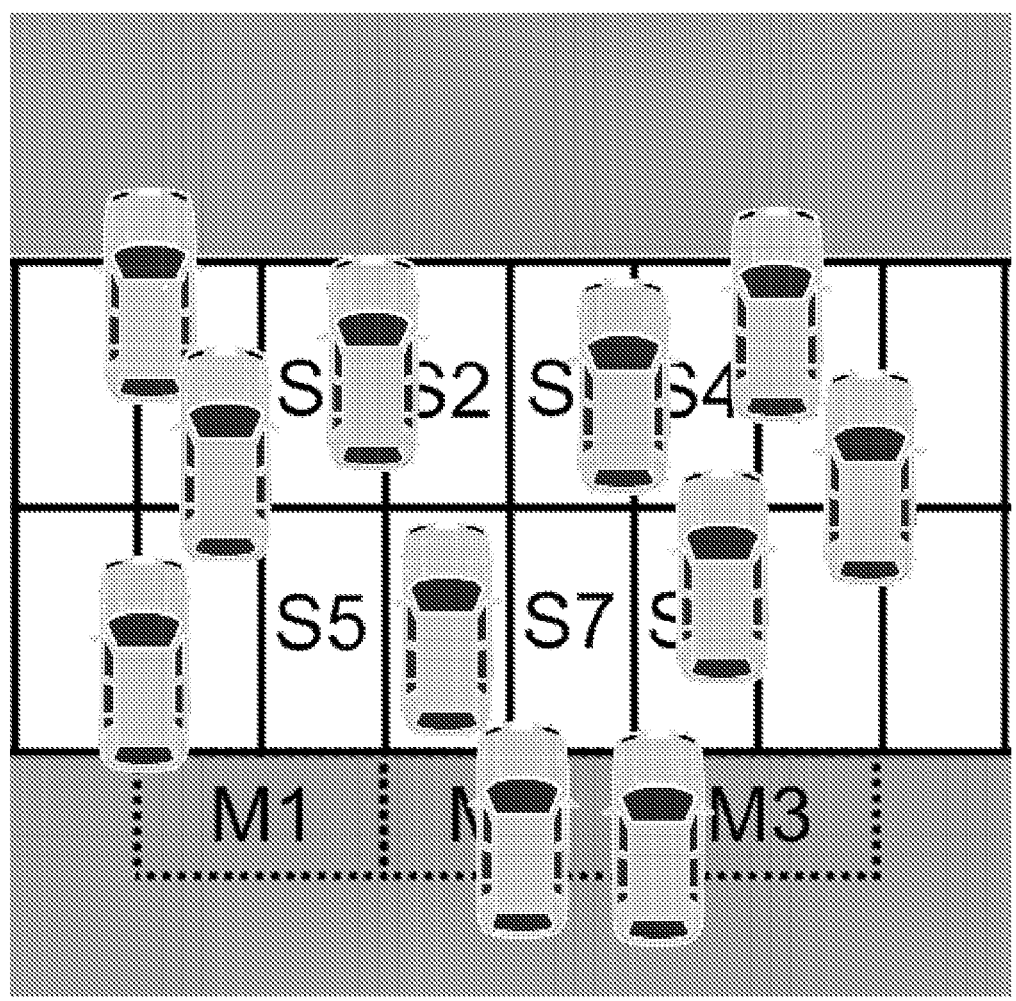
FIG. 13 is a similar view to FIG. 7, but showing the positions of eleven cars as they would potentially appear on a display before adjustment by the business rules.

FIG. 13 shows the potential appearance of the vehicles positions on a screen before adjustment according to the business environment rules; and FIG. 14 shows the actual screen display after the adjustment placing the cars in appropriate sub-areas/slots.

In the preferred mode, the location technology is RF based and uses the RSSI (Received Signal Strength Indicator) to estimate location. This location technology has an expected error radius of 15 feet.

Each vehicle is assigned a battery powered radio-transceiver (tag), which is called a blind node (location is unknown). The blind node is battery powered and hangs from the rear view mirror of the vehicle. During the assignment process, the vehicle identification number (VIN) is paired with the blind node's unique identifier and is uploaded to the central server.

The area has solar powered or hard-wired radio-transceivers installed throughout the lot, called reference nodes (with known locations). The transceivers are all connected in a mesh—network style and send location message updates to a central dongle. The dongle node connects to a PC, which in turn sends location information to a central server, which parses the location information and displays vehicles on the digital lot.

When a blind node begins moving, the motion sensor triggers and sends out a RF blast which is received and measured by the reference nodes in its immediate proximity. The references nodes, which are always on to receive messages from blind nodes and route messages to the dongle, each send a message back to the blind node with the received signal strength and their known (x,y) coordinates. The blind node then estimates its own location. It then sends a message through the mesh network of reference nodes to the dongle with its estimated location and its "moving" state. The dongle in turn sends the information to the PC.

When a blind node stops moving, the motion sensor stops triggering and the location process repeats. The blind node sends a message with its estimated location and its updated "parked" state.

The central server, using the assignment information of each blind node, identifies the vehicle, its estimated location, and its state (in motion or parked).

A tag similar to the tag intended for the vehicle, is the AeroScout T3 Tag, sold by AeroScout of Redwood City, Calif., web address: aeroscout.com, the disclosure of which is incorporated herein by reference, which includes identification of vehicle, position, motion and temperature detection.

Another application of the invention is in the mining industry. In such application, the area comprises a mine or site and sub-areas comprise shafts, passes, stations, levels, and chambers.

Mobile objects to be located include drills, electric shovels, buckets, materials (such as coal, copper, iron, precious metals, etc.), trucks, bulldozers, trams, bins.

An improvement in the accuracy of the determination of raw positional coordinates of each object (x,y,z) given multiple reference points (i.e. sensors, readers), where each reference point is part of a matrix of predetermined neighboring reference points, as determined by actual positions of the reference points and logical constructs/constraints (i.e. floors of a building), (and, thus, improve the accuracy of the measurement of approximate respective distances of respective mobile objects from respective potentially occupiable specific sub-areas), can be obtained by factoring in the unique characteristics of particular location technology systems to significantly improve the accuracy of an object's position by assigning different priorities to respective reference points.

Figure 16:
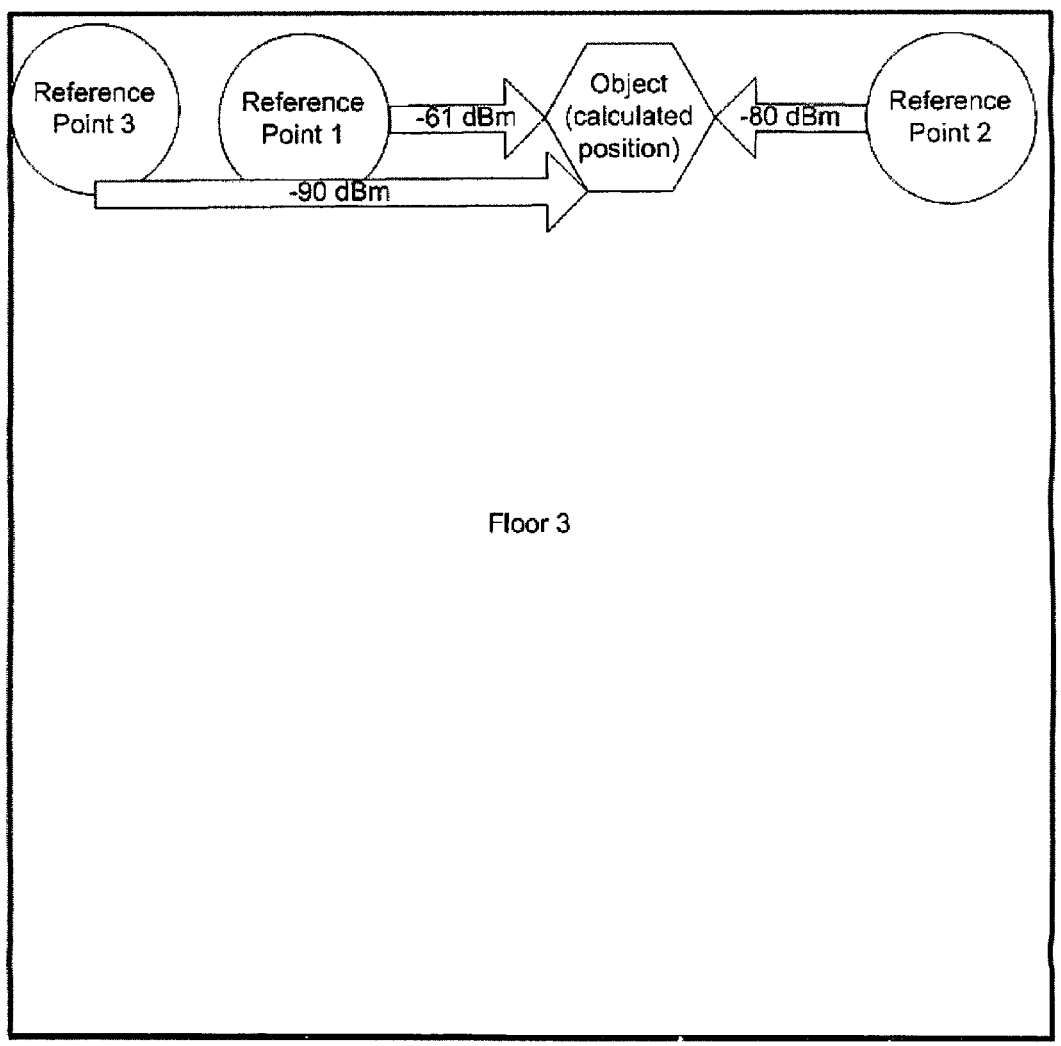
FIG. 16 is a schematic illustrating a calculated position of an object, such as a vehicle, in relation to three reference points in a set (or island) of sub-areas such as a third floor of a multi-storey garage; and, FIG. 17 is a schematic illustrating a calculated position of the object in relation to a fourth reference point in another set (or island) of sub-areas different from that shown in FIG. 16, such as on a second floor of the multi-storey garage.
Figure 17:
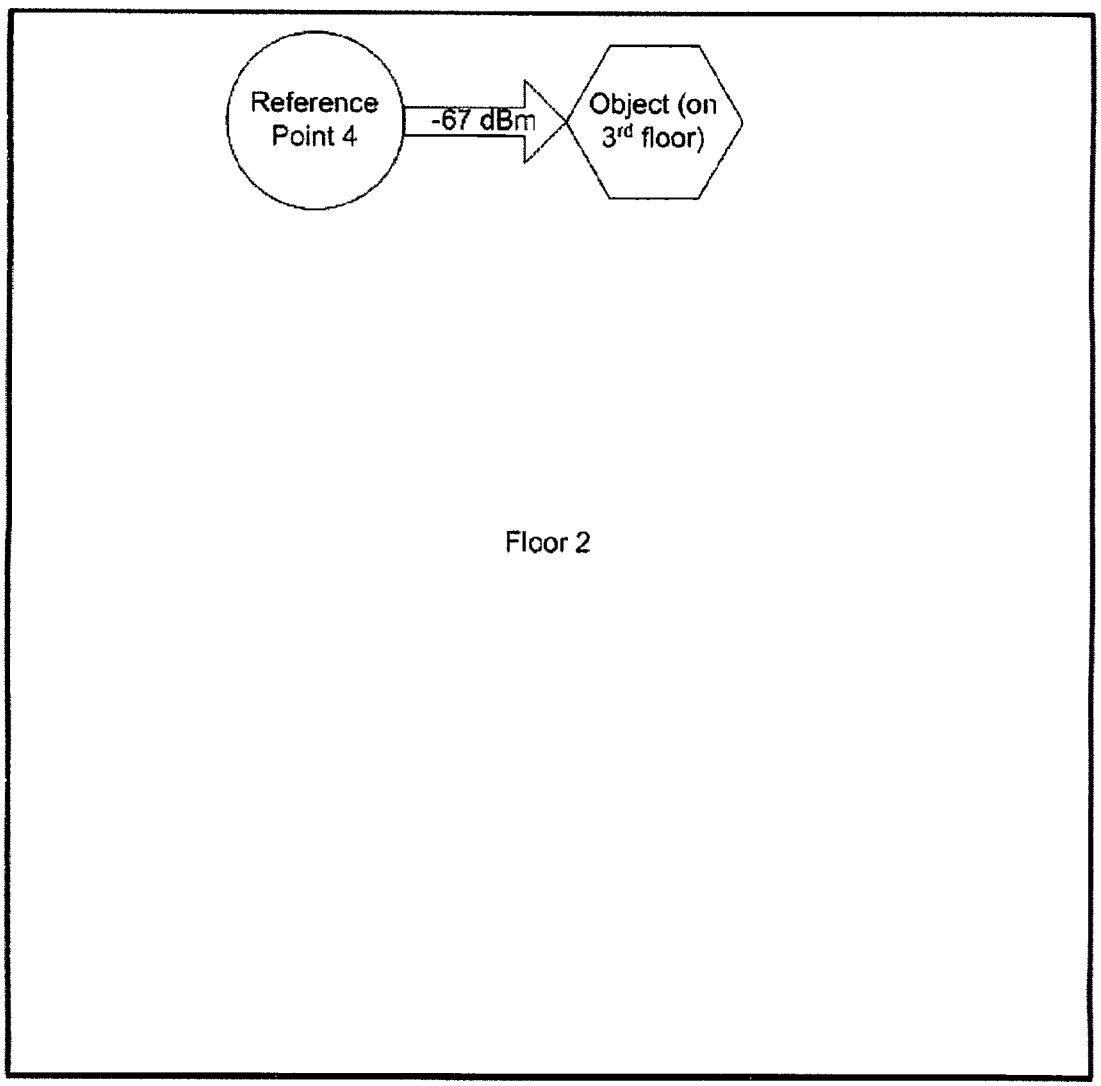

Initially, a reference point graph is mapped by partitioning reference points into 'neighbour islands' or different sets of sub-areas as disjoint, non-contiguous by non-contiguous portions of a neighbor graph. For example, such 'neighbour islands' will be defined/separated by building floors, walls or other barriers, either physical or rule driven—as simply separated by a space or distance as in two, parallel dedicated parking rows. For example, in FIG. 16, reference Points 1, 2, 3 are on one island and in FIG. 17, reference Point 4 is on another island.

Rules and Procedures for Establishing the Reference Point Graph

The reference point graph is configured once reference points have been set in an area The reference point graph contains reference point associations (neighbours)

Reference point islands emanates from the construction of the reference point graph, as disjoint sets of reference points Typically when two reference points are associated, they are in close proximity to each other, although this is not necessary The decision to associate two reference points (to form at least part of a neighbour island) is based on a number of factors including, but not limited to: proximity (distance between reference points), logical constructs (i.e parking rows), physical obstruction (i.e. floors), A reference point may be associated with one or more reference points (neighbour reference points), in any direction spatially (x,y,z)

If a reference point is associated with another reference point, the (neighbour) relationship is maintained by both reference points (i.e. no one-way relationship)

Thus, not all most adjacent/closest reference points will be deemed 'neighbours' so as together consitute a (same) 'neighbour island' because of logical constructs—such as building pillars causing blind spots preventing their signal (or physical/obstruction) association, excessive separation resulting in unusably weak signals Each RSSI is then translated into an adjusted value, according to a pre-determined table, and all the adjusted values are added per neighbor island. This example provides the following adjusted RSSI value table:

−40 to −70 dBm adjusts to 5
−70 to −80 dBm adjusts to 3
−80 to −90 dBm adjusts to 2
−90 to −100 dBm adjusts to 0.5
<−100 dBm adjusts to 0.1
Thus:
Reference Point 1: −61 dBm equates to 5
Reference Point 2: −80 dBm equates to 3
Reference Point 3: −90 dBm equates to 2
Reference Point 4: −67 dBm equates to 5
The island of Reference Points 1, 2, 3 would provide a total of 5+3+2=10 (in adjusted value)
The island of Reference Point 4 would provide a total of 5 (in adjusted value)

The object (vehicle) is then anchored (associated with) a reference point which has the strongest RSSI, (the closest), within the neighbor island with the greatest adjusted value. If two neighbor islands are equal/tied in adjusted value, the strongest RSSI across all neighbor islands is picked for the primary reference point.

Thus, for this example we have a simple neighbor table as follows:
Reference Point 1 has neighbors Reference Point 2 and Reference Point 3
Reference Point 2 has neighbor Reference Point 1
Reference Point 3 is a neighbor Reference Point 1
Reference Point 4 has no neighbor Reference Point 1 is the primary reference point with −61 dBm. The strongest RSSI among reference points that are neighbors with Reference Point 1, (being within the same neighbour island) is then determined. Although, Reference Point 4 (−67 dBm) is displaying a higher reading than Reference Points 2 and 3, this information is discarded, as reference Point 4 is not a neighbour (in a same neighbour island or set of sub-areas) as Reference Point 1, (it is on a different floor). Reference Point 2 is now the secondary reference point, since its RSSI (−80 dBm) is stronger than Reference Point 3 (−90 dBm).

The object is now anchored on a line segment (vector) joining the primary and secondary reference points. The exact location on that line segment is deduced by inputting −61 dBm into the formula:

$$RSSI = -(10n \log_{10} d + A)$$

where empirically deduced variables $A=40$ and $n=3$.

This yields a distance of 5 meters between Reference Point 1 and the object along the line segment (vector), but as the distance between Reference Point 1 and Reference Point 2 is 8 meters (not shown in FIG. 16), the distance is capped to 4 meters (the midpoint between Reference Point 1 and Reference Point 2). This then can be translated into raw positional coordinates (x,y,z) for most probable/accurate vehicle placement.

The invention claimed is:

1. A computer implemented method for automatically tracking positions of specific, uniquely identified mobile objects to improve object resolution in a real time simultaneous display of multiple mobile objects in specific sub-areas of a facility area on a GUI comprising the steps of:
    measuring approximate respective distances of respective mobile objects from respective potentially occupiable specific sub-areas by:
    providing a wireless signal processing network;
    providing individual identifying tags on respective mobile objects which tags at least one of transmit and transceive wireless signals between the tag and the network; mapping and providing a neighbour table/graph of object reference points associated with sub-areas which object reference points at least one of receive and transceive wireless signals between the reference point and the network;
    mapping and providing a neighbour table/graph of object reference points associated with sub-areas which object reference points at least one of receive and transceive wireless signals between the reference point and the network;
    partitioning the sub-areas and their associated reference points (by non-contiguous portions of the neighbour table) into respective sets/islands of sub-areas and reference points;
    providing a predetermined table of adjusted values assigned to respective values of potential signals received by the network;
    measuring values of signals received at one of respective reference points and at a mobile object and translating them into adjusted values as determined by the table of adjusted values;
    totalling adjusted values of signals associated with reference points on respective neighbour islands and anchoring/associating the mobile object to the neighbour island with the highest adjusted value total as the primary neighbour island unless totals are equal in which case the reference point having the highest adjusted value of all neighbour reference points is selected as a primary reference point;
    measuring a first distance from the mobile object of a closest, primary reference point in the primary neighbour island as determined by the reference point of the highest adjusted signal value;
    measuring a second distance from the mobile object of a next closest, secondary associated reference point neighbouring the primary reference point (in the primary neighbour island) being the reference point of the next highest adjusted signal value;
    measuring a line segment/vector extending between the primary reference point and the secondary reference point;
    placing the mobile object on the line segment/vector spaced apart from the primary reference point by a distance determined by an empirically generated rule-base system based on both of the mobile object's distance from the primary reference point and the mobile object's distance from the secondary reference point and providing that the maximum placement distance from the primary reference point is one half of the total distance between the primary and secondary reference points; and, utilizing the placement for display in the facility area on the GUI.

2. The method of claim 1 wherein the sub-areas comprise mobile object parking/storage slots and mobile object movement slots.

3. The method of claim 1 wherein the mobile objects are vehicles.

4. The method of claim 2 wherein the mobile objects are vehicles.

5. The method of claim 2 wherein the tags and the reference points are radio transceivers.

* * * * *